United States Patent [19]

Kaneko

[11] Patent Number: 4,482,266
[45] Date of Patent: Nov. 13, 1984

[54] BALL JOINT

[75] Inventor: Shinji Kaneko, Kanagawa, Japan

[73] Assignee: Tokico Ltd., Kawasaki, Japan

[21] Appl. No.: 435,396

[22] Filed: Oct. 19, 1982

[30] Foreign Application Priority Data

Oct. 23, 1981 [JP] Japan .................. 56-158200

[51] Int. Cl.³ .................................. F16C 3/00
[52] U.S. Cl. ................................... 403/135; 403/122
[58] Field of Search ............... 403/143, 122, 135, 140, 403/136, 144, 134, 124, 125, 126, 127, 128, 129, 130; 29/149.5 B; 384/210, 206, 208, 203

[56] References Cited

U.S. PATENT DOCUMENTS 3,384,396 5/1968 Hamilton ........................... 403/126
3,574,368 4/1971 Songer ............................... 403/128
4,367,968 1/1983 Ishida ................................ 403/122

FOREIGN PATENT DOCUMENTS 904963 2/1954 Fed. Rep. of Germany ...... 403/122
944289 12/1963 United Kingdom .
967655 8/1964 United Kingdom .
1182876 3/1970 United Kingdom .
1462798 1/1977 United Kingdom .

Primary Examiner—Andrew V. Kundrat
Attorney, Agent, or Firm—Wenderoth, Lind & Ponack

[57] ABSTRACT

A ball joint including a socket member having a recess therein for rockingly receiving a ball end of a ball member, and a retaining ring for retaining the ball end in the recess. The socket member is made of synthetic resin, and an annular plate member formed of metal is fitted in the recess for transmitting the force acting on the retaining ring from the ball member to the socket member.

1 Claim, 3 Drawing Figures

BALL JOINT

BACKGROUND OF THE INVENTION

This invention relates to a ball joint and, particularly to a ball joint of the kind including a socket member having a recess therein for receiving a ball end of a ball member and a retaining ring for retaining the ball end in the recess.

Ball joints of the aforementioned kind are well known for connecting a mechanical part with another mechanical part and are widely used in various industrial fields.

Conventionally, the ball member and the socket member of the ball joint have been made of a metal such as steel however, recently, there has been proposed to form the socket member of synthetic resin for reducing the weight and the manufacturing costs. When the socket member is made of synthetic resin, another problem has been experienced namely that when a force acts on the ball member in the direction for extracting the ball end from the recess in the socket member, the force is transmitted to the socket member through the retaining ring which is usually formed of metal such as steel and, at that time, a stress concentration may sometimes occur which results the breakage of the socket member, and the ball member separates from the socket member.

SUMMARY OF THE INVENTION

An object of the invention is to solve the problem aforementioned and, according to the invention, an annular plate member preferably formed of metal is interposed between the retaining ring and the socket member for transmitting the force from the retaining ring to the socket member.

In a preferred embodiment, the annular plate member has a generally tapered cylindrical configuration with a radially inner flange being provided on the small end, and the plate member is fitted to the inner surface of the recess in the socket member.

According to the invention, the force acting on the ball member in the direction for extracting the same from the recess in the socket member is transmitted to the socket member through the retaining ring and the plate member, thus the force is uniformly distributed along the contacting surface between the socket member and the plate member, thereby avoiding the breakage of the socket member and improving the durability of the ball joint.

BRIEF DESCRIPTION OF THE DRAWINGS

Further objects and advantages of the invention will become apparent from the following detailed description taken with reference to accompanying drawings, in which.

DETAILED DESCRIPTION OF THE PREFERRED EMBODIMENT

Figure 1:
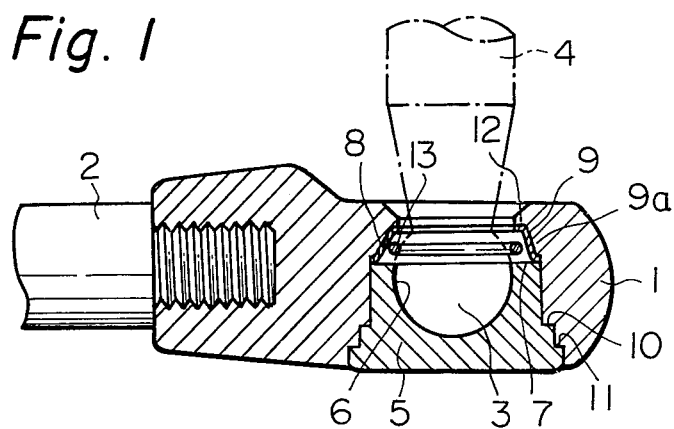
FIG. 1 is a longitudinal sectional view of a ball joint according to the invention.

In the drawings is shown a socket member formed of a synthetic resin, and the socket member is secured to for example the tip end of a rod 2 of a gas spring (not shown). A recess 3 is provided in the socket member to rockingly receive therein a ball end 4a of a ball member 4. The socket member is formed of two elements 1 and 5 which are separately fabricated by for example injection molding process and are assembled together and are secured integrally by for example a welding process.

The element 5 has a surface 6 defining recess 3 for snugly receiving the ball end 4a of the ball member 4 and has a generally flat top surface 7.

A tapered or inclined surface 8 is formed in the element 1 to receive an annular plate member 9. The plate member 9 has a generally tapered cylindrical configuration and has a radially inner flange 12 on the small diameter end. The plate member 9 is formed of metal such as steel. The radially inner flange 12 is provided on the upper end of the inclined surface 8.

Figure 2:
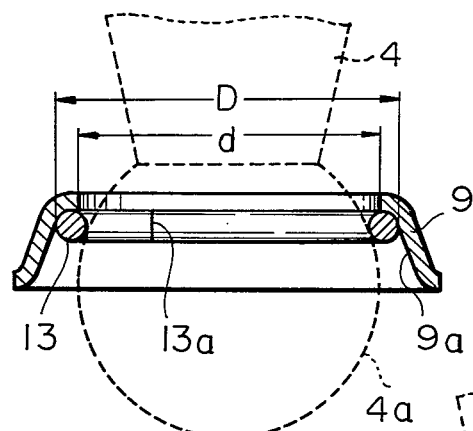
FIG. 2 is an enlarged partial view showing the retaining ring and the annular plate member according to the invention.

A metal ring 13, preferably formed of steel, having split portion 13a, is provided in the recess 3 and acts as a retaining ring preventing the extraction of the ball end 4a of the ball member 4 from the recess 3. As shown in FIG. 2, the outer diameter D of the retaining ring 13 in the minimum diameter condition, or when the split portion 13a is closed, is larger than the inner diameter d of the inner flange of the plate member 9 and, preferably, is nearly equal to the inner diameter of the smallest diameter portion of the tapered inner surface 9a of the plate member 9. Thus, when the ball end 4a moves upward as seen in FIG. 2, the retaining ring 13 is tightly pressed against the inner surface of the plate member 9, and the increase in the diameter of the ring 13 is reliably prevented, thereby preventing the extraction of the ball member 4 reliably.

Figure 3:
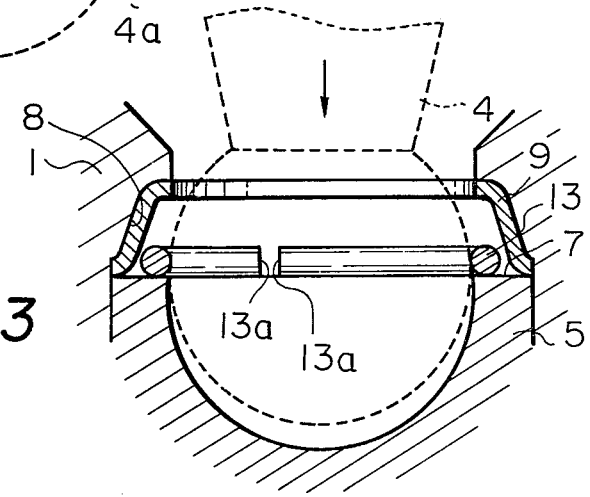
FIG. 3 is a view similar to FIG. 2, but showing a step in the assembling process.

In assembling the ball member 4 in the recess 3, the retaining ring 13 is pressed against the flat surface 7 as shown in FIG. 3 and the diameter is increased by expanding the split portion 13a. Thereafter, the ball end 4a is fully received in the recess 3 and the retaining ring 13 takes the position shown in FIG. 1 with the split portion 13a being closed.

When a force acts on the ball member 4 in the upward direction as seen in the drawings, the ball end 4a of the ball member 4 and the retaining ring 13 take the positions as shown in FIG. 2. The increase in the diameter of the ring 13 is prevented and the force transmitted to the ring 13 is distributed by the plate member 9 and is transmitted to the socket element 1. Accordingly, the breakage of the socket element 1 due to the stress concentration is prevented.

In the embodiment, the socket member formed of two elements, but the socket member 1 may be formed of a single element having integrally embedded therein the plate member 9. The retaining ring 13 may be assembled after the molding process through the opening of the plate member 9 by vertically displacing the split portion and helically rotating the retaining ring 13.

What is claimed is:

1. A ball joint comprising: a socket member of synthetic resin and having a recess therein and opening out of said socket member and being for receiving the ball end of a ball member;

an annular plate member in said recess around the opening thereof and having a tapered cylindrical configuration with a radial inner flange on the small end and with the small end toward said opening; and a retaining ring against the inside of said annular plate member;

whereby when a ball end is in said recess, said retaining ring transmits the force of the ball end in a direction out of the recess to said annular plate member which in turn transmits it to said socket member for holding the ball end in said recess.

* * * * *